C. R. RANEY.
SHOCKING MACHINE ATTACHMENT.
APPLICATION FILED JAN. 22, 1913.
1,222,797.
Patented Apr. 17, 1917.
2 SHEETS—SHEET 1.
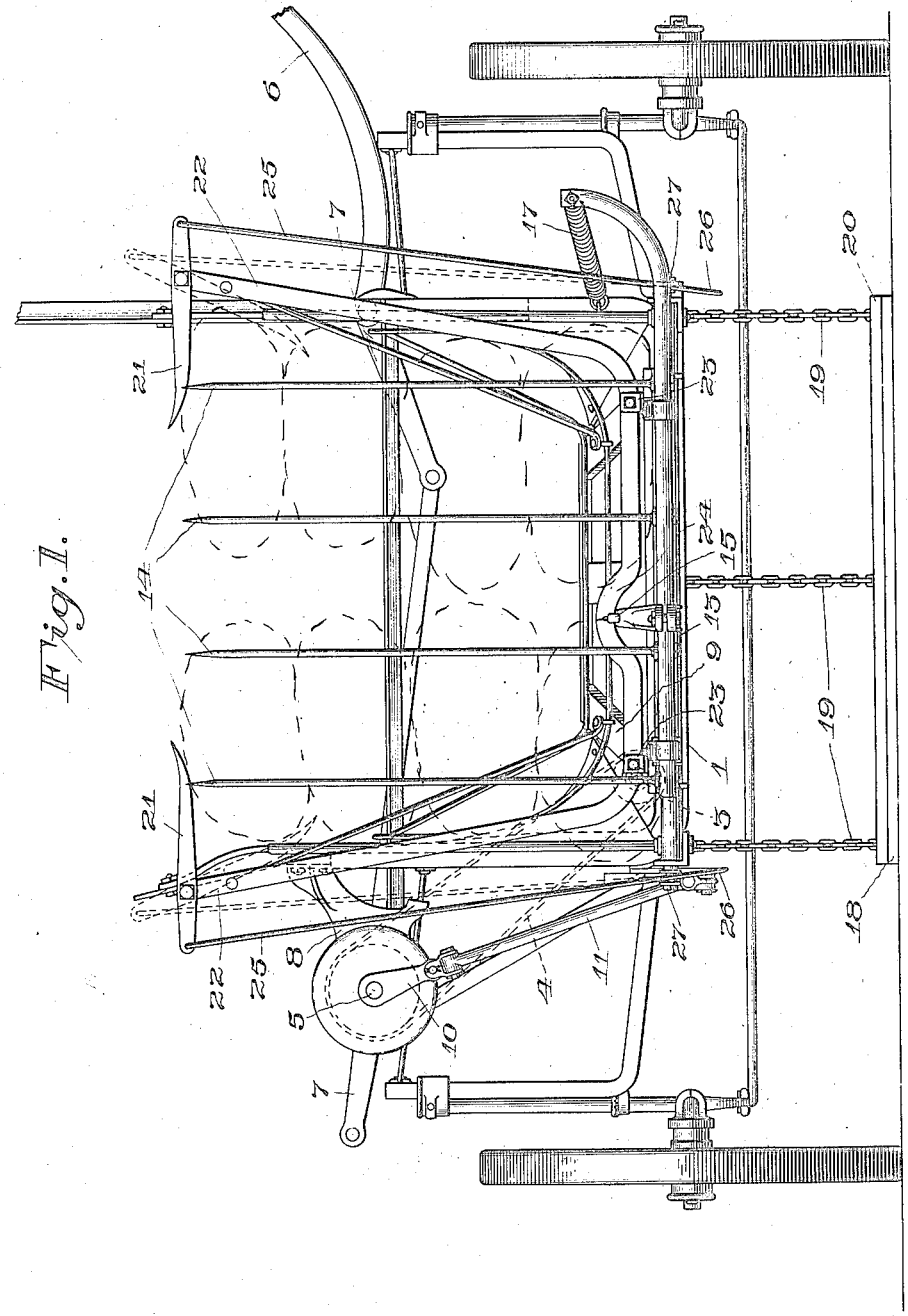

C. R. RANEY.
SHOCKING MACHINE ATTACHMENT.
APPLICATION FILED JAN. 22, 1913.
1,222,797.
Patented Apr. 17, 1917.
2 SHEETS—SHEET 2.
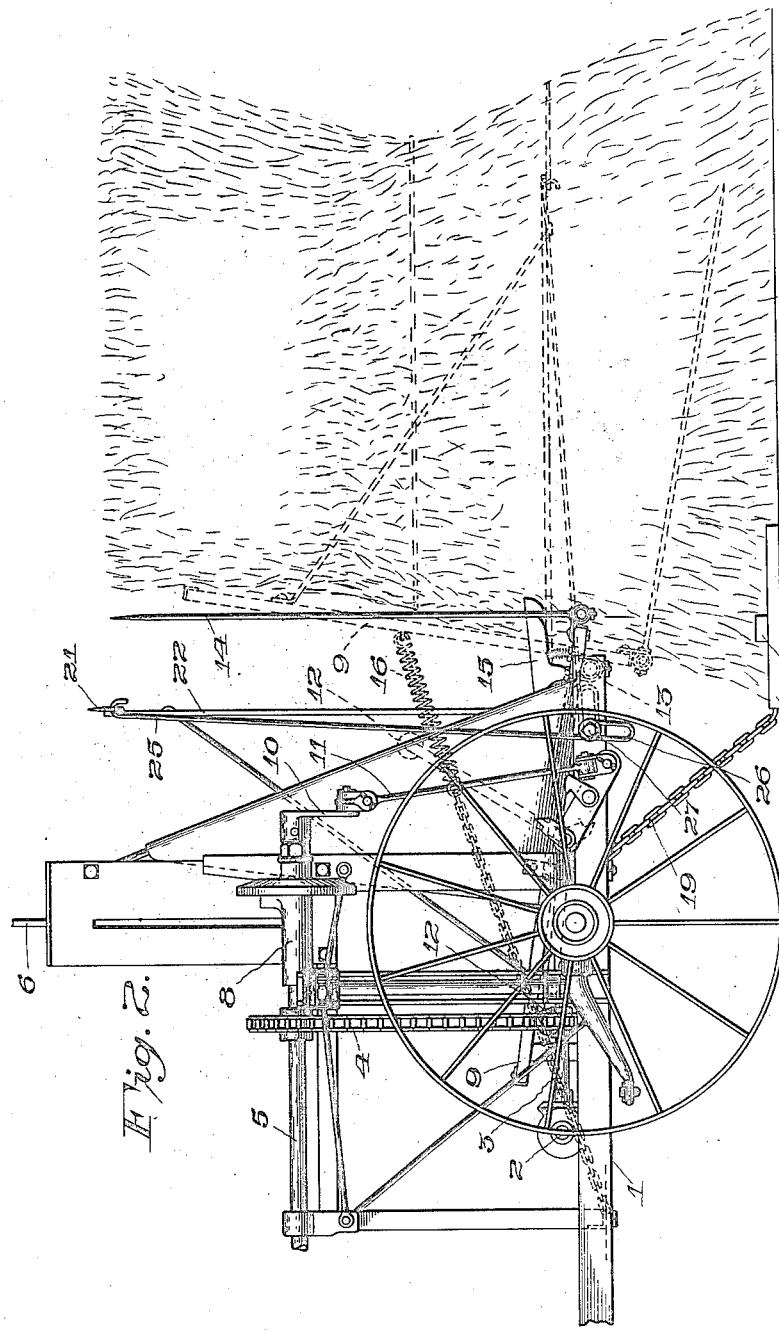
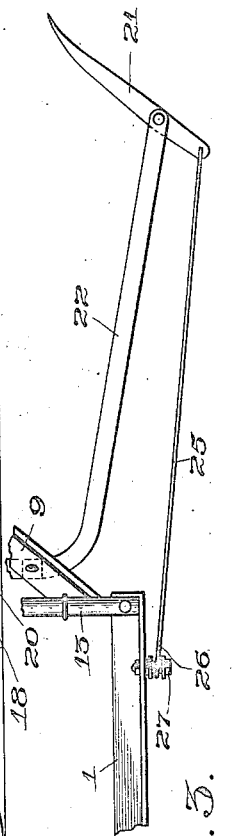
Witnesses:
Inventor.
Clemma R Raney
By Chas. E. Lord
Atty.

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

SHOCKING-MACHINE ATTACHMENT.

1,222,797.    Specification of Letters Patent.    Patented Apr. 17, 1917.

Application filed January 22, 1913. Serial No. 743,562.

*To all whom it may concern:*

Be it known that I, CLEMMA R. RANEY, a citizen of the United States, residing at Chicago, in the county of Cook and State of Illinois, have invented certain new and useful Improvements in Shocking-Machine Attachments, of which the following is a full, clear, and exact specification.

My invention relates to shocking machine attachments.

It has for its object to spread the butt of a shock in an improved manner. I attain this object by providing improved automatically acting means coöperating with the shock discharging mechanism and engaging the butts of certain sheaves and spreading the same as the shock is deposited upon the ground, so that these butts assist in forming a substantial base for the shock.

In order to disclose my invention, I have illustrated one embodiment of the same in the accompanying drawings. It is to be understood, however, that the embodiment shown herein for the purpose of illustration may be modified without departing from the spirit of my invention.

In these drawings:—

Figure 1 is a rear elevation of a shocker equipped with my invention;

Fig. 2 is a side elevation of the same;

Fig. 3 is a detail view of one of the butt spreading members.

The shocker shown is of the type described and claimed in my copending application Serial No. 674135 filed January 29, 1912, wherein automatically operated mechanism for delivering the sheaves to a movable sheaf receiving cradle coöperates with automatic mechanism for binding and discharging the sheaves in said cradle in the form of a shock. As the sheaf delivering mechanism, however, forms no part of my present invention, I have accordingly omitted an illustration of the same herein, only illustrating the movable sheaf receiving cradle with the sheaf binding, discharging and coöperating mechanisms.

These mechanisms are carried upon the rear of a shocker frame 1 and are operable from a power shaft 2 through a stub shaft 3, sprocket and chain connections 4, and a knotter shaft 5. As described in that application, a binding needle 6, carried upon one side of the frame 1, is automatically operated by the shaft 5 at a predetermined time through crank and link connections 7 to move transversely across the frame 1 into position to coöperate with a knotter 8 carried upon the opposite side of the frame and bind the sheaves in a movable sheaf receiving cradle 9 pivoted upon the rear of the frame.

This cradle is also operated from the knotter shaft 5 through a crank 10, a link 11 and tripping mechanism 12, and upon the completion of each binding operation is tilted backward about its pivot 13 to discharge the shock therefrom. As described in that application, the cradle 9 is provided at its rear end with end tines 14 which normally extend at right angles thereto and are releasable therefrom as the cradle is being tripped, by suitable automatic tripping mechanism 15 to enable the shock to drop out upon the ground. After each shock is discharged therefrom the cradle 9 is automatically returned to sheaf receiving position upon the frame 1 by means of a spring 16, and the end tines 14 thereof are likewise returned to their initial position as the shocker is drawn forward, by means of a spring 17. The butts of the sheaves on the under side of the cradle; that is, the side of the shock which is adjacent the shocker as the shock is set up on the ground, are automatically projected, pulled out or spread relative to the body of the shock by a transversely extending board 18 trailed upon the ground at the rear of the shocker by means of chains 19 and, if desired, having a transversely extending cleat 20, which is always beneath the butts of the sheaves in the shock as the latter is set up on the ground.

In my improvement I provide improved means for spreading the butt of the shock. Further, I provide means adapted to coöperate with the butt spreading means just described and spread the butts of sheaves on the opposite side of the shock as the latter is being deposited upon the ground, so that when the shock is set up the butts of sheaves on opposite sides of the same are spread in such a manner as to form a substantial base therefor. These means are shown in the form of pivoted members 21 carried at the rear end of the shocker cradle 9 and above the same, in a preferred form of my invention being carried upon the upper ends of vertically extending standards 22. These members are preferably pivoted at one side of their center and provided with elongated tines of a length substantially the same as the width of a sheaf. It is to be noted that the standards 22 are shown to be protruded slightly at an angle to the vertical in such a manner as to form a substantially trough-shaped cradle, and that the members 21 are thus adapted to underlie or pierce the sheaves adjacent thereto. If desired, the tine-carrying standards 22 may be formed of a single U-shaped piece of metal which is fixed to the bottom of the cradle 9 by any suitable means 23, and is provided with an upwardly extending bowed portion 24, substantially in the middle of its horizontal portion, which acts to protect the tripping mechanism 15. At their outer or shorter ends the tines 21 are pivotally connected to longitudinally movable links 25, normally extending downwardly substantially parallel with the standards 22. These links are provided with slotted lower extremities 26 movable along and around outwardly extending bolts 27 carried on opposite sides of the frame 1 at points adjacent the extremities of the rock shaft 13. The normal position of the tines 21 and links 25 is shown in full lines in Fig. 1, wherein the weight of the links 25 is shown to normally balance the tines and throw the same upward into elevated or substantially horizontal position in the path of the sheaves delivered to the cradle. The position of the tines, when the cradle is filled, is shown in this figure in dotted lines. The position of the tines during their butt spreading operation is shown in dotted lines in Fig. 2.

The operation of the mechanism shown is as follows: When the sheaves delivered to the cradle have reached a predetermined height the tines 21 are automatically forced downward by the succeeding sheaves delivered thereto into the dotted line position shown in Fig. 1. As soon as the cradle is filled, the shock binding mechanism is automatically operated from the knotter shaft 5, as described in the above mentioned application, and the needle 6 is thrown across the sheaves to bind the same. Upon the continued rotation of the shaft 5 the shock discharging mechanism is automatically operated through the connections 10, 11, 12, etc., throwing the cradle 9 backward about its pivot to the dotted line position shown in Fig. 2. As the cradle moves backward about its pivot the tines 21 are likewise thrown about their pivots, their links 25 moving about the bolts 27 to the dotted line position shown in Fig. 2. Since the tines 21 are beneath the sheaves at opposite corners of the shock, during the backward movement of the cradle these tines thus project, pull out or spread laterally and rearwardly relative to the body of the shock the butts of these sheaves in such a manner that when the shock is set vertically upon the ground the butts of these sheaves form a steadying means for the shock. At the same time the butts of the sheaves on the bottom of the cradle 9 are engaged and pulled outward by the board 18 and strip 20 as the shocker is moved forward, thus spreading these butts forward; that is, in the direction of movement of the shocker. Thus the butts of the sheaves on both sides of the shock are spread out in opposite directions to form a substantial base for the shock. Obviously, as soon as the shock has been set by the cradle 9, the latter is returned to its initial position by its spring 16, and since the tines 21 are fixed to the cradle and movable therewith, these tines are likewise returned to their initial position shown in full lines in Fig. 1, ready to spread the butts of the next shock. As described in the above mentioned application, the cradle end tines 14 are automatically withdrawn from under the shock as the shocker moves forward and are automatically returned to their initial position by their spring 17.

It is to be noted that the butt spreading tines act automatically to spread the sheaves on the right and left sides of the shock in such a manner as to produce a stable shock. It is further to be noted that these tines are adapted to coöperate, if desired, with the trailing board 18 or other devices performing the same function, in such a manner as to spread the sheaves upon the front and rear sides of the shock. Attention is further directed to the fact that the means described herein are entirely automatic in their operation, being thrown into service automatically when the cradle is thrown to shock discharging position, and being automatically returned to their initial position upon the return of the cradle to its initial position. It is further to be noted that both the butt spreading tines and the butt spreading board normally occupy such positions that they are ready to operate upon a shock.

While I have described one form of my invention in this application, it is, of course, to be understood that the form shown herein for the purposes of illustration is susceptible of modification without departing from the spirit of my invention.

What I claim as new and desire to secure by Letters Patent is:

1. In a shocking machine, shock discharging mechanism, and means on the shocker for positively increasing the size of the rear side of a shock set thereby relative to the body thereof.

2. In a shocking machine, shock setting mechanism, and means on the shocker for positively projecting outward the butts of sheaves on the rear side of a shock set thereby.

3. In a shocking machine, shock discharging mechanism, and means mounted on the machine for projecting laterally the butts of sheaves on the rear side of a shock set thereby.

4. In a shocking machine, shock discharging mechanism, and means engaging the shock for projecting laterally and rearwardly the butts of sheaves on the rear side of a shock set thereby.

5. In a shocking machine, a tilting normally prostrate shock receptacle, and means on the shocker for positively projecting outward the butts of sheaves on the rear corners of a shock set thereby.

6. In a shocking machine, shock setting mechanism, and means for kicking outward relative to the butt of a shock set thereby the butts of certain corner sheaves thereof.

7. In a shocking machine, shock setting mechanism, and positively actuated means for projecting outwardly relative to the butt of a shock set thereby and to each other the butts of certain sheaves on opposite corners of said shock.

8. In a shocking machine, shock setting mechanism, and positively actuated means operable during the operation thereof for projecting outward and laterally relative to the butt of a shock set thereby the butts of certain corner sheaves thereof.

9. In a shocking machine, a shock discharging cradle, and means actuated thereby and movable relative thereto for projecting the butts of certain sheaves outwardly relative to the body of the shock as the latter is discharged therefrom.

10. In a shocking machine, a shock discharging cradle, and means actuated thereby and movable relative thereto for projecting the butts of certain sheaves outwardly laterally relative to the body of the shock as the latter is discharged therefrom.

11. In a shocking machine, a shock discharging cradle, and means actuated thereby and movable relative thereto for projecting the butts of certain sheaves outwardly laterally on opposite sides of the body of the shock as the latter is discharged from said cradle.

12. In a shocking machine, a shock discharging cradle, and means actuated thereby and movable relative thereto as a shock is set for projecting outwardly relative to the body of the shock the sheaf butts at a plurality of corners thereof.

13. In a shocking machine, a shock discharging cradle, and means actuated thereby and movable relative thereto as the shock is set for projecting laterally and rearwardly relative to the body of the shock the butts of certain corner sheaves thereof.

14. In a shocking machine, a frame, a shock discharging cradle thereon, and means actuated by said cradle upon movement of the same relative to said frame and movable with respect to the cradle in a plane transverse thereto for projecting rearwardly the butts of certain sheaves of the shock.

15. In a shocking machine, a shock discharging cradle, and positively actuated means coöperating therewith for projecting outwardly in substantially opposite directions relative to the butt of the shock as it is set the butts of sheaves upon opposite sides of the same.

16. In a shocking machine, a shock discharging cradle, means for binding the shock therein, and positively actuated means coöperating with said cradle for projecting outwardly in substantially opposite directions relative to the butt of the bound shock as it is set the butts of sheaves on opposite sides of the same.

17. In a shocking machine, mechanism for discharging a shock therefrom, and means coöperating with said discharging mechanism as the shock is set for projecting outwardly relative to the body of the shock the butts of sheaves on the side of the shock adjacent the discharging mechanism and on the opposite side of said shock.

18. In a shocking machine, mechanism for discharging a shock rearwardly therefrom, and means coöperating with said discharging mechanism as the shock is set for projecting outwardly relative to the body of the shock the butts of certain sheaves in a fore and aft direction and the butts of certain others laterally in substantially opposite directions.

19. In a shocking machine, a frame, a tilting shock receptacle normally reclining thereon, a transversely extending butt spreading tine pivoted on said receptacle above the bottom thereof and in the path of sheaves delivered thereto, and tine operating connections between said tine and a part of the frame.

20. In a shocking machine, a frame, a tilting shock receptacle normally reclining thereon, a plurality of transversely extending butt spreading tines pivoted on opposite sides of said receptacle above the bottom thereof and in the path of sheaves delivered thereto, and tine actuating mechanism connecting said tines and a part of said frame.

21. In a shocking machine, a frame, a tilting shock receptacle normally reclining thereon, standards carried on said receptacle and extending upward on opposite sides of the same, transversely extending butt spreading tines pivoted at the upper ends of said standards, and longitudinally movable link mechanism connecting one of the extremities of said tines to said frame.

22. In a shocking machine, a frame, a tilting shock receptacle normally reclining thereon, mechanism for discharging a shock from said receptacle, and means operable as a shock is set for spreading relative to the body of the shock the butts of the top sheaves lying in said reclining receptacle.

23. In a shocking machine, a movable shock containing member, mechanism for discharging a shock therefrom, and automatically operated mechanism actuated by said discharging mechanism for spreading laterally in opposite directions the sheaves at the corners of the shock on the opposite side of the same from the discharging mechanism.

24. In a shocking machine, mechanism for discharging a shock therefrom, and means for projecting outwardly relative to the butt of the shock and toward the discharging mechanism sheaves on the side of the shock adjacent the discharging mechanism and simultaneously pulling outwardly laterally in opposite directions sheaves on the opposite side of the shock.

25. In a shocking machine, a shock discharging member, mechanism for binding a shock therein, and mechanism automatically operated upon the completion of the binding operation for discharging a shock therefrom and simultaneously projecting laterally from the body of the shock the butts of the corner sheaves on one side thereof.

26. In a shocking machine, a frame, a shock discharging receptacle thereon, a plurality of butt spreading members pivotally mounted upon opposite sides of said receptacle and in the path of sheaves delivered thereto, and actuating mechanism therefor automatically operable as said receptacle is moved to discharging position for throwing said butt spreading members about their pivots.

27. In a shocking machine, a frame, a tilting shock receptacle normally reclining thereon, mechanism for tilting said receptacle about its pivot to discharge a shock, a plurality of butt spreading tines pivotally mounted upon opposite sides of said receptacle, and tine actuating mechanism automatically operable as said cradle is tilted for throwing said tines about their pivots and spreading the butts of certain sheaves in the shock.

28. In a shocking machine, a frame, a tilting shock discharging cradle normally reclining thereon, upstanding end tines releasably attached to the end of said cradle, mechanism for tilting said cradle to discharge a shock and simultaneously release said end tines, and automatic means coöperating with said mechanism and movable with said cradle for spreading the butt of a shock as it is discharged from the latter.

29. In a shocking machine, mechanism for discharging a shock therefrom, means for pulling outwardly relative to the body of the shock and toward the discharging mechanism the butts of the sheaves in the shock adjacent said discharging mechanism, and automatic means coöperating with said discharging mechanism for projecting outwardly laterally relative to the body of the shock the butts of certain sheaves upon the opposite side of the shock.

30. In a shocking machine, a frame, a tilting shock receptacle normally reclining thereon, a plurality of transversely extending butt spreading members pivotally connected to opposite sides of said receptacle and normally disposed above the bottom thereof, and mechanism operatively connected between said members and said frame for permitting the depression of said tines upon the delivery of a sheaf to said receptacle and throwing said members upward about their pivots as said receptacle is moved to discharging position.

31. In a shocking machine, a frame, a tilting shock receptacle normally reclining thereon, standards carried on opposite sides of said receptacle, a plurality of transversely extending butt spreading tines normally disposed above the bottom of said cradle pivoted upon the upper ends of said standards, and longitudinally movable link mechanism operatively connected between the outer ends of said tines and said frame for throwing said tines upward about their pivots as said receptacle is tilted.

32. In a shocking machine, a frame, a pivoted shock receptacle normally reclining thereon, a plurality of transversely extending butt spreading tines disposed above the rear end of said receptacle and at the sides of the same, tine actuating mechanism movable with said member for throwing said tines about their pivots as said member is actuated, and a member attached to said frame and trailing at the rear thereof upon the ground coöperating with said tines and engaging the butts of sheaves on the opposite side of the shock.

33. In a shocking machine, a frame, a tilting shock receptacle normally reclining thereon, standards projecting upward on opposite sides of the rear of said receptacle, transversely extending butt spreading tines projecting part way over the bottom of said receptacle and pivoted on said standards at points intermediate their ends, links pivotally connected to the outer ends of said tines and extending downwardly therefrom, and a sliding slot and pin connection between the lower ends of said links and said frame.

34. In a shocking machine, a frame, a tilting shock receptacle normally reclining thereon, transversely extending butt spreading tines pivotally mounted above said receptacle at the rear and on opposite sides thereof, said tines being depressed by and underlying the top sheaves in a prostrate shock built in said receptacle, and means for throwing said tines about their pivots as said receptacle is tilted and returning said tines to their normal position when said receptacle is returned to its normal position.

In testimony whereof I affix my signature, in the presence of two witnesses.

CLEMMA R. RANEY.

Witnesses:
V. D. LAWLER,
R. B. HITCHCOCK.